Patented Mar. 22, 1949

2,465,205

UNITED STATES PATENT OFFICE 2,465,205

METHOD OF RECLAIMING VULCANIZED CO-POLYMERS OF BUTADIENE AND ACRYLO-NITRILE

Paul J. Dasher, Willoughby, Ohio, assignor to The B. F. Goodrich Company, New York, N. Y., a corporation of New York No Drawing. Refiled for application Serial No. 536,186, May 18, 1944. This application June 30, 1945, Serial No. 602,672

7 Claims. (Cl. 260—2.3)

This invention relates to a method of reclaiming vulcanized copolymers of a butadiene-1,3 and an alpha-methylene nitrile and to the products prepared thereby.

It is an object of this invention to provide a new method of reclaiming copolymers of a butadiene-1,3 and an alpha-methylene nitrile such as acrylonitrile. A further object of this invention is the provision of an improved reclaimed copolymer of the above type that can be used like the ordinary unvulcanized copolymer to make products having superior qualities. Other objects will become apparent in the detailed description of the invention given hereinafter.

I have discovered that vulcanized copolymers made from a butadiene-1,3 and an alpha-methylene nitrile may be reclaimed to produce plastic, vulcanizable materials that can be re-vulcanized like the original to make new products. I accomplish this by intimately associating with the vulcanized copolymer a minor proportion of an acrylic ester and an inhibitor of polymerization for said ester and then heating to convert the copolymer to a plastic, vulcanizable material. The acrylic ester has a reclaiming action on the vulcanized copolymer that reconverts it to a plastic material that can be used again to make new products. The reclaimed copolymer is permanently plastic so that it can be stored for long periods without stiffening or "setting-up."

In a typical example of the invention 90 parts, by weight, of a vulcanized butadiene-1,3 acrylonitrile copolymer containing 55 parts of butadiene-1,3 and 45 parts of acrylonitrile are mixed with 10 parts of methyl methacrylate and 1 part of hydroquinone and the mixture is introduced into an autoclave. The mixture is brought to a temperature of 300° F. from a beginning temperature of 85° F. in about 45 minutes. At the end of this time the autoclave is opened and the charge is removed. The acrylic ester will be found to be substantially unpolymerized and may be removed from the reclaimed copolymer as by squeezing it out on a rubber mill, or it may be left in, as desired. The reclaimed copolymer may then be sheeted out on an ordinary rubber mill to produce a plastic material that can be reused like the original copolymer before vulcanization. It can be stored for long periods without any appreciable change in its physical or chemical properties.

The temperature at which the mixture of copolymer and acrylic ester is heated may be as low as 200° F., or even lower, when the heating is a continuous process, or, as in the example above, the heating can be started from a low temperature and gradually increased to a higher one. The temperature used and the heating period may vary somewhat with the nature of the copolymer and the particular acrylic ester employed. However, a wide latitude of choices is possible with lower temperatures being used for longer periods and higher temperatures for shorter periods. Temperatures as high as 400° F. or 450° F., or even higher, may be used, limited only by the tendency of the materials to decompose at higher temperatures. In any event the heating should be continued until the vulcanized copolymer is in a plastic condition. Such choices of temperatures and periods of heating are all within the knowledge of the man skilled in the art.

It is necessary in this invention that the acrylic ester remain in substantially an unpolymerized condition throughout the reclaiming operation. This may be accomplished by introducing a minor proportion of a polymerization inhibitor into the mixture. These inhibitors include the hydroquinones, aromatic amines such as the phenyl beta-naphthyl amines, phenols, and all types of antioxidants ordinarily used in rubber and synthetic rubber compositions. While the inhibitors usually and preferably will be an organic compound such as those hereinabove indicated, the compounds which may serve as polymerization inhibitors are practically limitless as almost any foreign material will either prevent entirely, or at least materially restrict, polymerization of the acrylic ester. Thus, when the vulcanized copolymer contains the ordinary compounding and conditioning ingredients it is not necessary to add a special inhibitor as one or more of the ingredients themselves will inhibit polymerization in substantially all cases. In order for a material to serve successfully as an inhibitor it is not necessary that any critical quantity be present as oftentimes scarcely more than a trace will be sufficient. Ordinarily only a minor proportion, less than 20% and usually from about 0.05% to about 3% by weight of the acrylic ester will be used. However, there is no objection, other than increased cost, to using larger amounts.

The acrylic ester used as the reclaiming agent may be employed in any amount desired. Obviously, however, the ester should not be used in such a large amount that it is wasted. Neither should it be used in such a small amount that only incomplete reclaiming is accomplished. In general the minimum quantity should be about 3% by weight of the copolymer. The maximum may be as large as desired as an excess of the ester will not harm the copolymer. However, for most economical operation, the amount used should seldom, if ever, be more than 50% by weight of the copolymer.

The copolymer of an alpha-methylene nitrile and a butadiene-1,3 which is reclaimed in this invention includes not only copolymers of the nitrile with butadiene-1,3 itself but also with the hydrocarbon homologs of butadiene-1,3 which polymerize in essentially the same manner. These homologs include isoprene, 2,3-dimethyl butadiene-1,3, piperylene, 2-methyl pentadiene-1,3, and the like. The proportions of butadiene-1,3 or its homologs, with the nitrile may be any copolymerizable proportion although those most commonly used range from 25 parts of butadiene-1,3 and 75 parts of the nitrile to 75 parts of butadiene-1,3 and 25 parts of the nitrile.

The term "alpha-methylene nitrile" is used to designate compounds containing a methylene group attached to a carbon atom adjacent to a nitrile group; that is, compounds having the structure

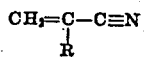
$$CH_2=C-C\equiv N$$
$$\;\;\;\;\;\;\;\;|$$
$$\;\;\;\;\;\;\;\;R$$

wherein R is a hydrogen or a hydrocarbon group. Thus, in addition to acrylonitrile, the preferred material wherein the unattached valence is connected to a hydrogen, the term includes other similar nitriles wherein the unattached valence is connected to aliphatic or aromatic or other hydrocarbon groups, such as methacrylonitrile, ethacrylonitrile, alpha-phenylacrylonitrile, and the like.

The term "acrylic ester" used in the specification and claims includes aromatic and aliphatic esters of acrylic acid, methacrylic acid, ethacrylic acid, alpha-chloro acrylic acid, and the like, and includes specifically such compounds as methyl acrylate, ethyl acrylate, n-propyl acrylate, isopropyl acrylate, n-butyl acrylate, amyl acrylate, hexyl acrylate, allyl acrylate, 2-ethyl hexyl acrylate, n-octyl acrylate, decyl acrylate, duodecyl acrylate, benzyl acrylate, chloro-ethyl acrylate, methoxy methyl acrylate, the corresponding methacrylates, ethacrylates, alpha-butacrylates, phenacrylates, furyl acrylates, alpha-chloro acrylates, and the like. As expressed structurally, the acrylic esters have the formula

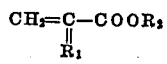
$$CH_2=C-COOR_2$$
$$\;\;\;\;\;\;\;\;\;\;|$$
$$\;\;\;\;\;\;\;\;\;\;R_1$$

wherein $R_1$ is a chlorine atom, a hydrogen atom, or an alkyl hydrocarbon radical, preferably with no more than six carbon atoms, and $R_2$ is a radical of an aliphatic or aromatic monohydric alcohol.

This application is re-filed for abandoned application Serial No. 536,186, filed May 18, 1944.

Having described my invention together with specific examples of materials usable in the method of the invention and preferred conditions for practicing the method, it is desired that the invention be not limited by any of these details, unless otherwise specified, but rather be construed broadly within its true spirit and scope as set out in the accompanying claims.

I claim:

1. The method of reclaiming a vulcanized copolymer of a butadiene-1,3 hydrocarbon and an alpha-methylene nitrile having the structure

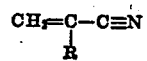
$$CH_2=C-C\equiv N$$
$$\;\;\;\;\;\;\;\;|$$
$$\;\;\;\;\;\;\;\;R$$

wherein R is a member of the class consisting of hydrogen and a hydrocarbon group containing less than seven carbon atoms, which method comprises intimately associating with said vulcanized copolymer 0.05–50% by weight based on the weight of copolymer of an acrylic ester having the structure

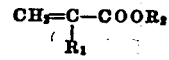
$$CH_2=C-COOR_2$$
$$\;\;\;\;\;\;\;\;\;\;|$$
$$\;\;\;\;\;\;\;\;\;\;R_1$$

wherein $R_1$ is selected from the class consisting of chlorine, hydrogen, and an alkyl hydrocarbon radical containing less than seven carbon atoms, and $R_2$ is a radical of a monohydric alcohol, heating said copolymer and ester while associated together at 200°–450° F. to convert said vulcanized copolymer to a plastic, vulcanizable material and at the same time inhibiting polymerization of said acrylic ester.

2. The method of reclaiming a vulcanized rubbery composition which comprises intimately associating with a vulcanized copolymer of a butadiene-1,3 hydrocarbon and an alpha-methylene nitrile having the structure

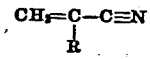
$$CH_2=C-C\equiv N$$
$$\;\;\;\;\;\;\;\;|$$
$$\;\;\;\;\;\;\;\;R$$

wherein R is a member of the class consisting of hydrogen and a hydrocarbon group containing less than seven carbon atoms, from 3% to 50% by weight based on the weight of said vulcanized copolymer of an acrylic ester having the structure

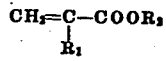
$$CH_2=C-COOR_2$$
$$\;\;\;\;\;\;\;\;\;\;|$$
$$\;\;\;\;\;\;\;\;\;\;R_1$$

wherein $R_1$ is a member of the class consisting of chlorine, hydrogen and an alkyl hydrocarbon radical containing less than seven carbon atoms, and $R_2$ is a radical of a monohydric alcohol, heating said vulcanized copolymer and said acrylic ester while associated together at 200°–450° F. to convert said vulcanized copolymer to a vulcanizable plastic material and simultaneously inhibiting polymerization of said acrylic ester.

3. The method of reclaiming a vulcanized copolymer of a butadiene-1,3 hydrocarbon and an alpha-methylene nitrile having the structure

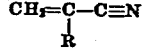
$$CH_2=C-C\equiv N$$
$$\;\;\;\;\;\;\;\;|$$
$$\;\;\;\;\;\;\;\;R$$

wherein R is a member of the class consisting of hydrogen and a hydrocarbon group containing less than seven carbon atoms, which method comprises intimately associating with said vulcanized copolymer 3–50% by weight based on the weight of copolymer of an ester of acrylic acid having the structure $CH_2=CH-COOR$ wherein R is an aliphatic hydrocarbon group containing less than seven carbon atoms, heating said vulcanized copolymer and said ester while associated together at 200–450° F. to convert said vulcanized copolymer to a plastic vulcanizable material and at the same time inhibiting polymerization of said ester of acrylic acid during said heating, and thereafter separating unpolymerized acrylic acid ester from said converted copolymer.

4. The method of reclaiming a vulcanized rubbery composition, which method comprises intimately associating with a vulcanized copolymer of a butadiene-1,3 hydrocarbon and an alpha-methylene nitrile having the structure

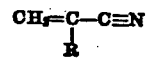
$$CH_2=C-C\equiv N$$
$$\;\;\;\;\;\;\;\;|$$
$$\;\;\;\;\;\;\;\;R$$

wherein R is a member of the class consisting of hydrogen and a hydrocarbon group containing less than seven carbon atoms, 3–50% by weight based on the weight of said copolymer of an ester of methacrylic acid having the structure $$CH_2=C-COOR$$
$$\phantom{CH_2=}\,|$$
$$\phantom{CH_2=C-}CH_3$$

wherein R is an aliphatic hydrocarbon group containing less than seven carbon atoms, heating said vulcanized copolymer and said ester while associated together at 200–450° F. to convert said vulcanized copolymer to a plastic vulcanizable material and at the same time inhibiting polymerization of said ester of methacrylic acid during said heating, and thereafter separating unpolymerized methacrylic ester from the converted copolymer.

5. The method of reclaiming a vulcanized rubbery copolymer of butadiene-1,3 and acrylonitrile which comprises mixing with said copolymer an acrylic ester having the structure $$CH_2=C-COOR_2$$
$$\phantom{CH_2=}\,|$$
$$\phantom{CH_2=C-}R_1$$

wherein $R_1$ is selected from the class consisting of chlorine, hydrogen and an alkyl hydrocarbon radical containing less than seven carbon atoms, and $R_2$ is a radical of a monohydric alcohol, heating said mixture at 200°–450° F. to convert said vulcanized copolymer to a plastic vulcanizable material and at the same time inhibiting polymerization of said acrylic ester while said mixture is being heated.

6. The method of reclaiming a vulcanized rubbery composition which comprises intimately mixing a vulcanized copolymer of butadiene-1,3 and acrylonitrile with 3–50% by weight based on the weight of said copolymer of an acrylic ester having the structure $$CH_2=C-COOR_2$$
$$\phantom{CH_2=}\,|$$
$$\phantom{CH_2=C-}R_1$$

wherein $R_1$ is an alkyl hydrocarbon radical containing less than seven carbon atoms and $R_2$ is a radical of a monohydric alcohol, heating said copolymer and acrylic ester mixture at 200°–450° F. to convert said vulcanized copolymer to a plastic vulcanizable material while simultaneously inhibiting polymerization of said acrylic ester, and thereafter separating the unpolymerized acrylic ester from the converted copolymer.

7. The method of reclaiming a vulcanized copolymer of butadiene-1,3 and acrylonitrile which comprises mixing with said vulcanized copolymer 3–50% by weight of methyl methacrylate based on the weight of said copolymer, heating said mixture at 200°–450° F. to convert said vulcanized copolymer to a plastic vulcanized material while simultaneously inhibiting polymerization of said methyl methacrylate.

PAUL J. DASHER.

REFERENCES CITED

The following references are of record in the file of this patent:

UNITED STATES PATENTS

| Number | Name | Date |
|---|---|---|
| 2,104,760 | Renfrew | Jan. 11, 1938 |
| 2,320,536 | Pollack et al. | June 1, 1943 |
| 2,338,427 | Gumlich et al. | Jan. 4, 1944 |
| 2,356,091 | Roedel | Aug. 15, 1944 |